United States Patent
Oshins et al.

(10) Patent No.: US 10,209,899 B2
(45) Date of Patent: Feb. 19, 2019

(54) STORAGE VIRTUALIZATION OFFLOAD

(71) Applicant: Microsoft Technology Licensing, LLC, Redmond, WA (US)

(72) Inventors: Jacob Oshins, Seattle, WA (US); Neal Christiansen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 559 days.

(21) Appl. No.: 14/934,158

(22) Filed: Nov. 6, 2015

(65) Prior Publication Data

US 2017/0131920 A1    May 11, 2017

(51) Int. Cl.
*G06F 17/30* (2006.01)
*G06F 17/00* (2006.01)
*G06F 3/06* (2006.01)

(52) U.S. Cl.
CPC ............ *G06F 3/0613* (2013.01); *G06F 3/061* (2013.01); *G06F 3/0643* (2013.01); *G06F 3/0658* (2013.01); *G06F 3/0664* (2013.01); *G06F 3/0665* (2013.01); *G06F 3/0674* (2013.01); *G06F 3/0679* (2013.01); *G06F 3/0689* (2013.01)

(58) Field of Classification Search
CPC ......... G06F 17/30197; G06F 17/30221; G06F 3/067; G06F 3/0619; G06F 3/0649; G06F 3/065; G06F 3/0665; G06F 12/08; G06F 17/30; G06F 17/3028; G06F 17/30286; G06F 17/30318; G06F 17/30339; G06F 19/321; G06F 3/0607; G06F 3/061; G06F 3/0643; G06F 3/00
See application file for complete search history.

(56) References Cited

U.S. PATENT DOCUMENTS

| | | | | |
|---|---|---|---|---|
| 6,330,621 B1 * | 12/2001 | Bakke | ................... | G06F 3/0617 379/219 |
| 6,678,752 B1 * | 1/2004 | Ashton | ................. | G06F 3/0605 709/225 |
| 7,251,661 B1 * | 7/2007 | Reed | ................. | G06F 17/30286 |
| 7,457,897 B1 | 11/2008 | Lee et al. | | |

(Continued)

FOREIGN PATENT DOCUMENTS

TW    201118740 A    6/2011

OTHER PUBLICATIONS

"NVM Express", Published on: Nov. 3, 2014, Available at: http://www.nvmexpress.org/wp-content/uploads/NVM-Express-1_2-Gold-20141209.pdf.

(Continued)

*Primary Examiner* — Yicun Wu

(57) ABSTRACT

Embodiments relate to off-loading aspects of storage virtualization to storage hardware and modifying software to take advantage of hardware virtualization features. A co-design of hardware and software allows a filesystem to provide files such that indirection overhead normally needed to access the content of files can be bypassed while still managing the files as filesystem objects. A storage device manages and exposes a virtual volume which is used to store the content of a file. Virtual volumes can be initialized or populated so that virtual blocks therein align with device storage blocks. A virtual volume can be initialized and populated by parsing a virtual disk file to access virtual disk metadata, which is then used to determine and set features of the virtual volume.

20 Claims, 11 Drawing Sheets

(56) References Cited

U.S. PATENT DOCUMENTS

| | | | |
|---|---|---|---|
| 7,606,964 B2 | 10/2009 | Lee et al. | |
| 8,078,583 B2* | 12/2011 | Prahlad | G06F 17/30197 |
| | | | 707/651 |
| 8,266,099 B2* | 9/2012 | Vaghani | G06F 3/0607 |
| | | | 707/609 |
| 8,397,046 B2 | 3/2013 | Kudo | |
| 8,683,111 B2 | 3/2014 | Wade et al. | |
| 9,003,071 B2 | 4/2015 | Liu | |
| 2012/0233434 A1 | 9/2012 | Starks et al. | |
| 2013/0042056 A1 | 2/2013 | Shats et al. | |
| 2014/0188952 A1 | 7/2014 | Killamsetti et al. | |
| 2014/0195753 A1 | 7/2014 | Khatri et al. | |
| 2014/0281217 A1 | 9/2014 | Beam et al. | |
| 2015/0248366 A1* | 9/2015 | Bergsten | H04L 67/1097 |
| | | | 710/308 |
| 2015/0254088 A1 | 9/2015 | Chou et al. | |

OTHER PUBLICATIONS

Gupta, et al., "DFTL: A Flash Translation Layer Employing Demand-based Selective Caching of Page-level Address Mappings", In Proceedings of Fourteenth International Conference on Architectural Support for Programming Languages and Operating Systems, Mar. 7, 2009, 12 pages.

"SerialTek Adds Non-Volatile Memory Express (NVMe) Support for BusXpert Analyzers", Published on: Nov. 11, 2014, Avialable at: http://www.virtual-strategy.com/2014/11/11/serialtek-adds-non-volatile-memory-express-nvme-support-busxpert-analyzers#axzz3eQvPz9lf.

Jacobi, L. Jon, "Everything you Need to Know About NVMe, the Insanely Fast Future for SSDs", Published on: Apr. 3, 2015, Available at: http://www.pcworld.com/article/2899351/everything-you-need-to-know-about-nvme.html.

Wu, et al., "Selfie: Co-Locating Metadata and Data to Enable Fast Virtual Block Devices", In Proceedings of the 8th ACM International Systems and Storage Conference, Article No. 2, May 26, 2015, 2 pages.

Sivashankar, et al., "Design and Implementation of Non-Volatile Memory Express", In Proceedings of International Conference on Recent Trends in Information Technology, Apr. 10, 2014, 6 pages.

Meyer, et al., "Parallax: Virtual Disks for Virtual Machines", In Proceedings of the 3rd ACM SIGOPS/EuroSys European Conference on Computer Systems, Mar. 31, 2008, pp. 41-54.

"International Search Report and Written Opinion Issued in PCT Application No. PCT/US2016/060053", dated Feb. 24, 2017, 13 Pages.

* cited by examiner

STORAGE VIRTUALIZATION OFFLOAD

BACKGROUND

Some types of storage devices have performance capabilities that can be difficult to fully utilize in some circumstances. Consider, for example, a computer having a CPU connected through a PCIe (Peripheral Component Interconnect Express) bus to an SSD (solid state device) that implements a version of the NVMe (Non-Volatile Memory express) logical device interface standard. The SSD's cost might have the same order of magnitude as the cost of a traditional disk drive, and yet in the same computer with the same high-speed bus, the SSD's latency and throughput performance might be an order of magnitude greater than a spinning type of disk drive. In other words, when attached through a high performance bus such as a PCIe bus, an SSD's latency and throughput can improve to the point where the storage device has fundamentally different characteristics than other types of block-based storage devices such as disk drives with spinning media.

The availability of high speed buses brings to the fore the performance differences between SSDs and traditional spinning disk drives. On a high speed bus such as a PCIe bus, an SDD's net latency and throughput can be significantly superior to that of a spinning disk drive. For example, an SSD attached through a PCIe bus might have a few microseconds of latency and might be capable of tens or hundreds of gigabits per second of throughput.

Much software for accessing storage devices has been designed with assumptions that persistent block-based storage will be relatively slow. For example, an operating system might be designed to deprioritize processes accessing storage, since they will likely have idle cycles while waiting for storage to respond. Also, because storage has been slow relative to processors and memory, complex memory-demanding caching schemes are often used to improve effective storage performance. Typically, the memory used for caching can add significant cost and power load to a computing system. If storage were able to be accessed at speeds close to processor speed, less memory and power would be required.

The lag of storage speed has affected the progress of virtualization technology. While some aspects of storage virtualization have been implemented in hardware, other aspects of storage virtualization discussed herein have lacked justification and have not previously been considered, since virtualizing in software has proven sufficient. Storage systems have not been able to provide sufficient data throughput to justify non-software virtualization solutions. In addition, merely throwing additional CPU cycles at an operating system or virtualization software will not necessarily improve performance. Devices such as NVMe SSDs can exchange data with a system at rates that can impact the system's CPU; CPU load generally increases with the rate of data exchange. As storage decreases in cost and therefore increases in amount, the high throughput rates of such devices will tax the host system. If a portion of a host's processing capacity is dedicated to handling storage, as storage increases, less processing becomes available for other purposes.

Moreover, some software is designed to limit storage latency or throughput. When a virtual machine, for example, requests access to storage, a delay might be built in because on average such requests are shortly followed by other requests. This deferment or batching of requests reduces the number of relatively slow switches between a hypervisor context and a virtual machine context. If a storage device and its attachment are capable of ~30 us latency, an artificial 200 us batching delay reduces utilization of the storage hardware. And yet, if the virtualization software is tuned to work at 30 us, its CPU consumption could increase significantly (to handle the increased data throughput and access to the storage hardware).

It would be beneficial if there were convenient and cost-effective ways to improve storage virtualization efficiency. Techniques to that effect are described herein.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments relate to off-loading aspects of storage virtualization to storage hardware and modifying software to take advantage of hardware virtualization features. A co-design of hardware and software allows a filesystem to provide files such that indirection overhead normally needed to access the content of files can be bypassed while still managing the files as filesystem objects. A storage device manages and exposes a virtual volume which is used to store the content of a file. Virtual volumes can be initialized or populated so that virtual blocks therein align with device storage blocks. A virtual volume can be initialized and populated by parsing a virtual disk file to access virtual disk metadata, which is then used to determine and set features of the virtual volume.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to off-loading aspects of storage virtualization to storage hardware and modifying software to take advantage of hardware virtualization features. Discussion will begin with an explanation of how multiple layers of indirection in a storage stack affect processing load, throughput, and latency. A co-design of hardware and software that allows some of that indirection overhead to be moved to hardware while preserving desirable aspects of storage is then discussed. This is followed by discussion of embodiments for modifying storage devices to be capable of exposing virtual volumes, where the storage device exposes a virtual volume having a virtual block space and the storage device handles indirection between the virtual block space and device blocks in a device block space. Techniques for initiating and managing hardware-based virtual volumes are then discussed. Software embodiments to take advantage of virtual volumes are also set forth, including how to incorporate virtual volumes into a filesystem, and how to enable a virtual volume to store content of a filesystem object (e.g., a file) while at the same time enabling the storage virtualization software—or other software—to access the file as a filesystem object.

It should be noted that other types of storage software are analogous to filesystems and such storage software usually manages software-level objects (units of storage such as blobs, virtual volumes, etc.) in some ways that are analogous to filesystem objects. For instance, content-addressable data stores such as Amazon Corporation's Simple Storage Service™ and Microsoft Corporation's Azure Blob Store™ store data in blobs. Also, an object within a storage array such as a VMware Virtual Volume™ is analogous to a filesystem object. There are numerous types of software and objects that provide abstract access to data storage. Therefore, as used herein, "filesystem" and "filesystem object" are considered to cover software and objects that have similar relevant features. A relevant similar feature would be, for example, managing and exposing software-level storage units (files, objects, blobs, etc.) with a software-level address space (or namespace) by using indirection between the software-level address space and a lower-level storage address space used directly or indirectly by a storage device.

Figure 1:
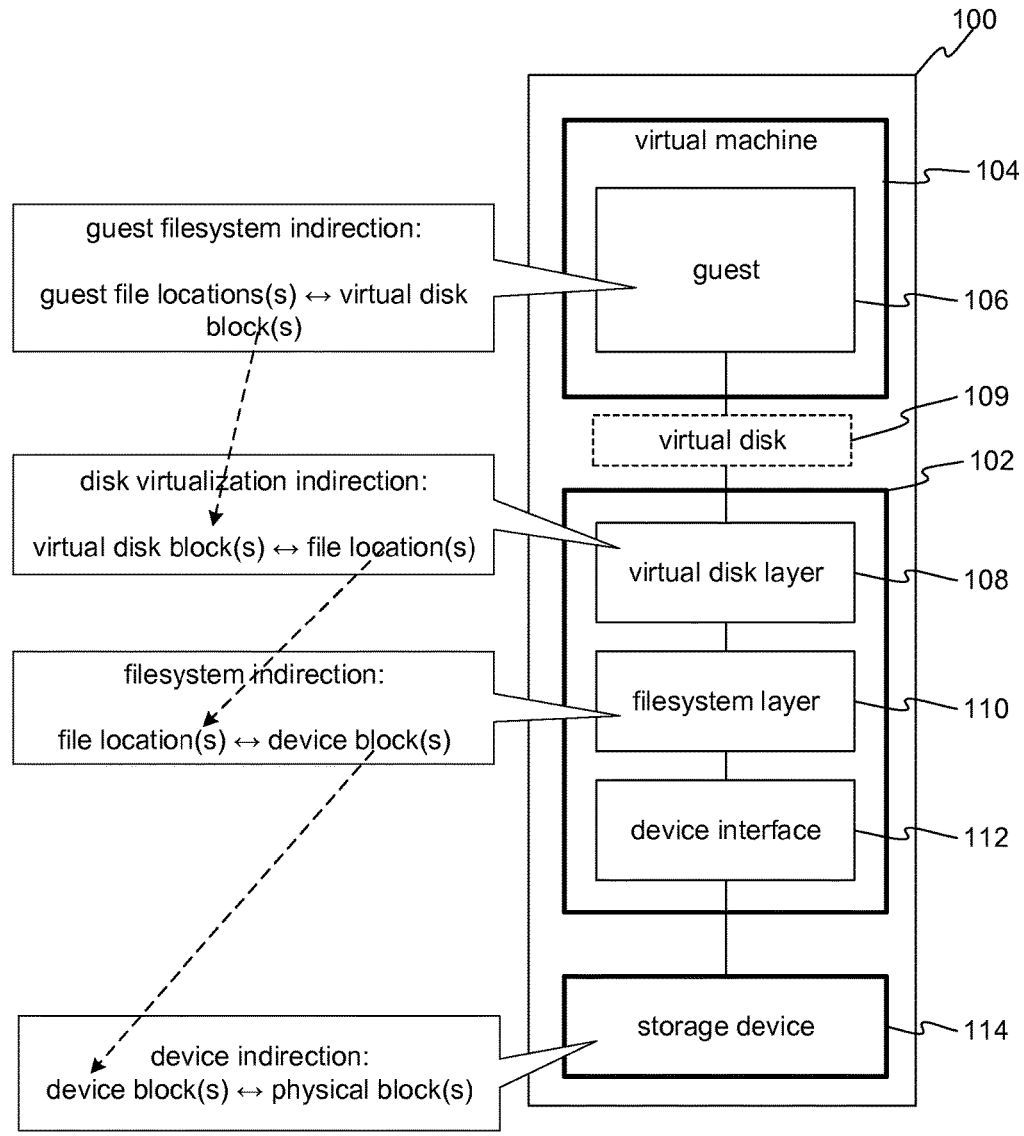
FIG. 1 shows an example of a computing device with a storage software stack that provides virtualized block-based access to a virtual machine.

FIG. 1 shows an example of a computing device 100 with a storage software stack 102 that provides virtualized block-based access to a virtual machine 104. The virtual machine 104 is managed by any known machine virtualization software such as a Xen hypervisor, a Hyper-V™ server, a VMWare™ platform, etc. It should be noted that embodiments herein are not limited to machine virtualization applications. Most machine virtualization software will use or implement some form of storage device virtualization to provide virtual machines with virtual disks, which virtual machines interface with as though they were hardware block-based storage devices.

Referring to FIG. 1, guest software 106 executing in the virtual machine 104 may have a guest operating system that includes a virtual device driver (not shown). The virtual device driver interfaces with a virtual device (a virtual disk) provided by a virtual disk layer 108. The virtual disk layer 108 typically implements a virtual disk file format and according thereto stores a virtual disk 109 in a file in an underlying filesystem layer 110. The file, often called a virtual disk file, is a file that the filesystem layer 110 manages generally like it would manage any other file. The software storage stack 102 usually includes a device interface 112, such as a device driver, to manage access to a storage device 114. Not all components of FIG. 1 need be present, and other components such as a volume layer, a partition layer, a VMWare Virtual Volume™ layer, or a device driver framework, might be present but are not significant to the technical disclosures herein.

As discussed in the Background, the data path between a client (e.g., virtual machine 106) using the virtual disk 109 and the hardware storage device 114 that stores the virtual disk file can be complex and may involve multiple levels of indirection that each add to the overall processing load of the computing device 100. A typical write operation will be described next. Only single blocks will be noted at each layer, although in practice multiple blocks may be implicated at any layer. As used herein, the term "block" will refer to any generic unit of storage that is managed at any hardware or software layer; a type of block being referred to will be apparent from context of the term. For example, blocks of SSDs are usually referred to as pages, but will be referred to herein as blocks.

Following the uppermost callout in FIG. 1, first, an application executing in the virtual machine 104 instructs a filesystem of the guest operating system to write data to a file location of the guest filesystem. The guest filesystem performs an indirection to map the guest file location (e.g., filename and offset) to a virtual disk block in the virtual disk 109. The virtual disk layer 108 in turn receives instructions to write to the virtual block. The virtual disk layer performs another indirection by mapping the number/identifier of the virtual block to a file location of the corresponding virtual disk file in the filesystem layer 110. The filesystem layer 110 indirects the file location to a device block. The device block contains the filesystem block, which contains the virtual block, which contains the guest file location.

Another transparent indirection might occur at the device level. Some SSDs maintain their own internal mapping between device blocks (block numbers exposed by the storage device) and physical blocks (internal block identifiers). This one-to-one mapping allows the SSD to decide which physical storage locations to use for updates without changing the exposed locations (device block numbers) of the stored data. The internal indirection gives the storage device the freedom to choose which physical blocks to use when an update is needed, which allows the device to evenly distribute degradation of its storage media.

Figure 2:
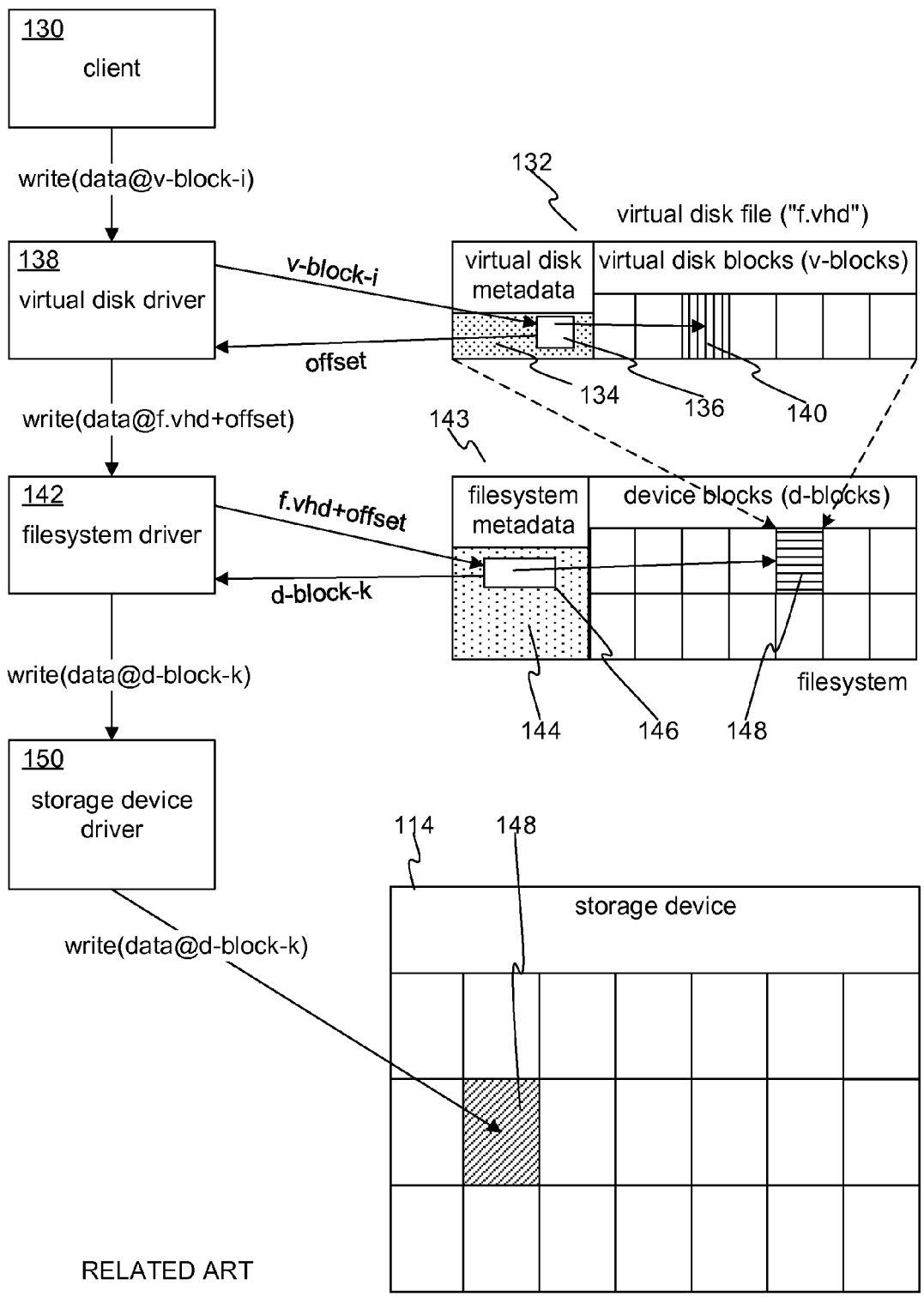
FIG. 2 shows details of how elements at different storage layers can perform indirection.

FIG. 2 shows details of how elements at different storage layers can perform indirection. A client 130 implements a virtual disk format. Content of a virtual disk file 132 is organized and maintained somewhat like a filesystem. The virtual disk file 132 contains virtual disk metadata 134 of two general types; virtual indirection metadata and virtual attribute metadata. The virtual attribute metadata may describe virtual disk features such as block size, a device type, a maximum virtual disk size, a location of a parent virtual disk file, etc. The virtual indirection metadata functions as an indirection map by mapping virtual blocks (virtual block numbers) to locations within the virtual disk file 132. Details of virtual indirection metadata are available elsewhere. Of note is the fact that any software that can parse and interpret the corresponding virtual disk format can use the virtual indirection metadata to determine filesystem locations of respective virtual blocks in the virtual disk file 132.

When the arbitrary client 130 writes data to a virtual disk block having identifier v-block-i, the client 130 passes the data and the virtual block identifier to a component that implements the virtual disk format, such as a virtual disk driver 138.

The virtual disk driver 138 checks the virtual indirection metadata to find a virtual indirection pairing 136 for v-block-i that maps v-block-i to a file location 140. The file location 140 is usually some form of offset within the virtual disk file 132. The virtual disk driver 138 then instructs a filesystem driver 142 managing a filesystem 143 (on which the virtual disk file 132 resides) to write the data to the virtual disk file 132 at the determined offset.

The filesystem 143 has filesystem metadata 144. Similar to the virtual disk metadata 134, the filesystem metadata 144 has filesystem attribute metadata and filesystem indirection metadata. The filesystem attribute metadata stores information about the filesystem 143 and the filesystem objects within it (e.g., ownerships, permissions, filenames, fullpaths, etc.). The filesystem indirection metadata maps file locations to device blocks. The filesystem driver 142 uses the file location (e.g., "f.vhd"+offset) to find a filesystem indirection pairing 146 that maps the file location to a device block 148 having identifier d-block-k. The filesystem driver 142 tells a storage device driver 150 or the like to write the data to the virtual block d-block-k.

The storage device 114 receives the data and the device block identifier d-block-k and stores the data accordingly. If the storage device 114 is an NVMe SSD, then the data and device block identifier are received by the storage device 114 in PCIe signals, for example, containing NVMe messages from the storage device driver 150.

Figure 3:
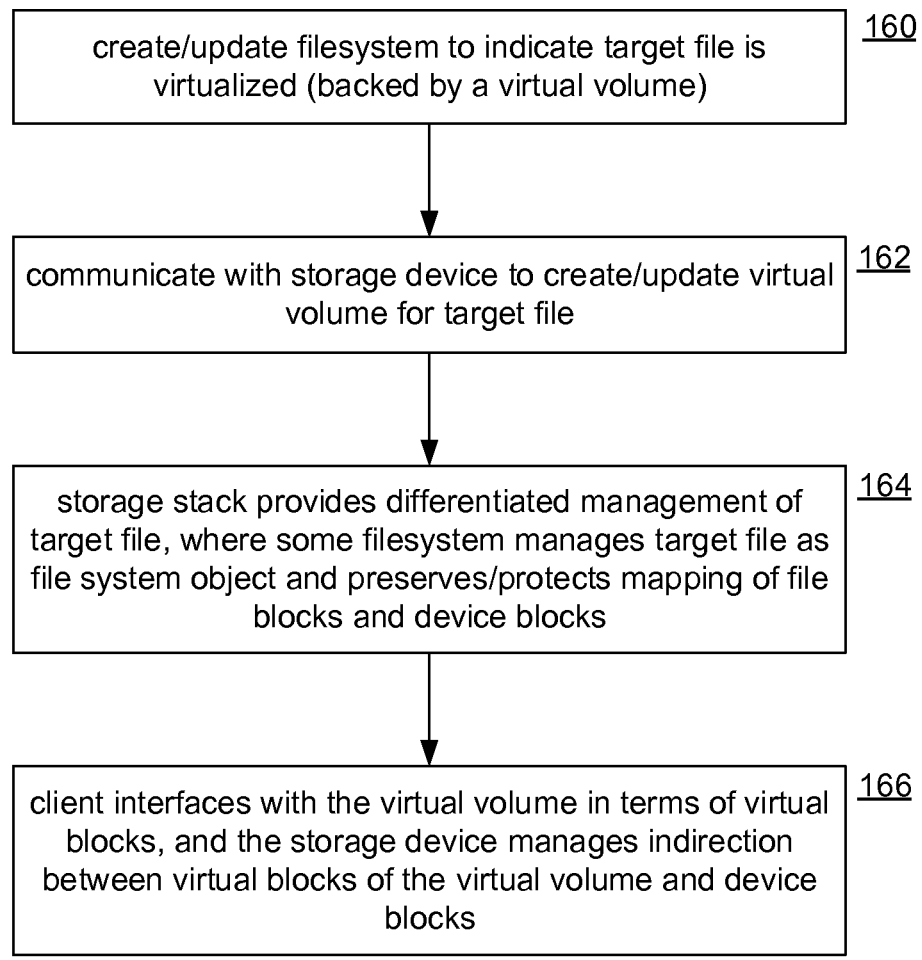
FIG. 3 shows an overview of how one or more layers of software indirection can be avoided without necessarily losing the conveniences of using a filesystem to manage and access a virtual disk file.

FIG. 3 shows an overview of how one or more layers of software indirection can be avoided without necessarily losing the conveniences of using a filesystem to manage and access a virtual disk file. At step 160, a filesystem on which a virtual disk file resides is updated to store a flag indicating that a particular target file is associated with a virtual volume. The flag could be an attribute in the filesystem metadata of the target file, for example. At step 162, communication to the storage device causes the storage device to create a virtual volume. The storage device provides a form of virtualized block access through the virtual volume. The notion of virtualized block access may include, among other things, implementing or tracking an indirection between virtual blocks and device blocks, where the storage device receives requests to read and write specific virtual blocks and translates those operations to device blocks. Or, the storage device receives updates directed to device blocks and also receives corresponding updates to the indirection metadata At step 164, based on the flag, a storage stack provides differentiated management of the target file. As described further below, in some ways the target file is managed like any other filesystem object, and in other ways the target file is specially managed to facilitate efficient reliable use of the virtual volume, where the virtual volume is the media on which the storage device that stores at least the content of the file. For example, if the target file is a virtual disk file used by a virtual machine, the virtual volume stores data of the virtual machine tenant. At step 166, a client such as a virtual disk driver interfaces with the virtual volume by communicating directly with the storage device (or perhaps through another device driver), specifying reads and writes in terms of virtual blocks, and the storage device uses local indirection data to map the virtual blocks to device blocks. The client can interface with the virtual volume without having to go through the storage stack, and in particular, the filesystem that is managing the target file. Alternatively, the client determines which virtual blocks are allocated to which device blocks, sends updates to device blocks, and informs the virtual volume of corresponding indirection updates. The storage device preserves device blocks associated with or allocated to a virtual volume.

Although FIG. 3 and others herein discuss a virtual file/disk layer and a filesystem layer, it should be noted that the hybrid software-hardware virtualization techniques described herein can be applied to either or both layers. Generally, embodiments herein can be applied to any storage software that uses indirections between an upper layer storage unit (e.g., clusters, virtual blocks, etc.) and a lower layer storage unit (e.g., volume or device blocks). For example, a filesystem itself can be modified to use a device-virtualized volume. Because both filesystems and disk virtualization software use the same kind of indirection metadata to self-organize and map the storage of blocks, the embodiments described herein can be readily applied to either or both types of storage software. Any embodiment described herein with reference to one type of software should be considered to be equally descriptive of the other type of software, or any other software that uses block-based indirection. Embodiments may be particularly helpful where it is desirable for software to continue to perform many of its filesystem facing functions, even if some of its indirection logic is bypassed or eliminated. Moreover, the minimalist forms of hardware virtualization described herein make them convenient for storage device manufacturers to support in hardware and/or firmware. For instance, based on disclosures herein, it would be a straightforward endeavor to extend the NVMe standard to support virtual volumes. Consider the following side note.

Commands can be sent to the NVMe "admin queue" to define regions of media as a secondary namespace. Other optional NVMe commands might specify that the secondary namespace's data should contain data found in the primary namespace. Such commands could take the form of supplying "mapping pairs" of primary namespace blocks to secondary namespace blocks. Alternatively, the same objective can be accomplished by "copy offload" techniques, similar to the ODX (Offload Data Transfer) part of the SCSI standard. That is, there is a specification that data should be copied from one block of the primary namespace to a block of the secondary namespace, but with some hint that there is no need to actually duplicate the data, and that the two can share the same media.

Figure 4:
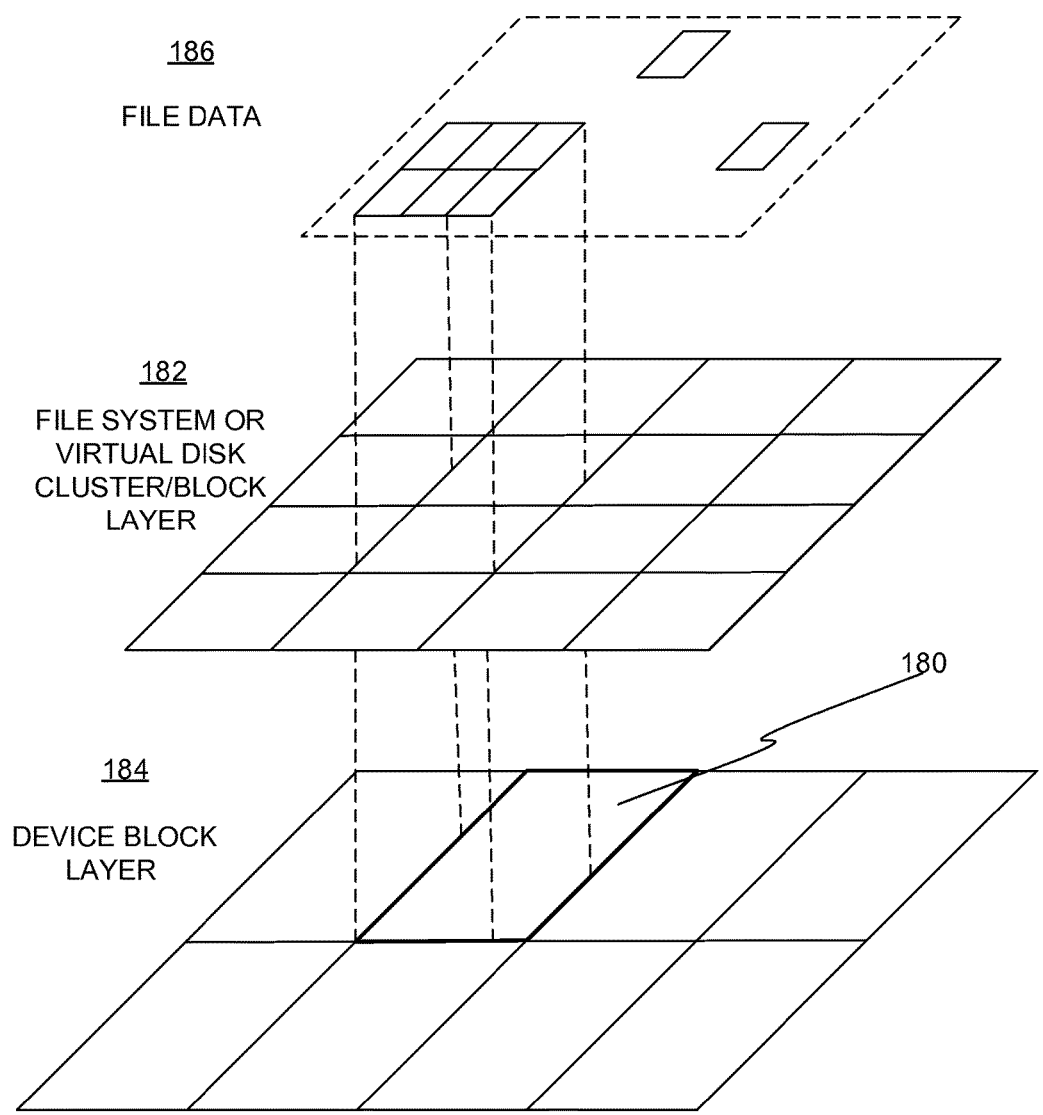
FIG. 4 shows a conceptual diagram of alignment between storage layers.

FIG. 4 shows a conceptual diagram of alignment between storage layers. For efficiency and for consistency between a software block layer 182 and a device block layer 184, alignment with the device blocks of the storage device's virtual volume will be desirable. As used herein, alignment refers to arranging blocks such that, to the extent possible, beginnings of virtual blocks coincide with beginnings of device blocks, or with regular offsets therefrom. An offset for a given virtual block might be a multiple of the virtual block size of the relevant virtual volume. In the case where virtual blocks, for example, are even divisions of device blocks, such alignment will be space-efficient. A many-to-one indirection is equally feasible. A many-to-many indirection may also be used, for instance, for redundancy.

For ease of understanding, embodiments herein may be described in terms implying a simple one-to-one mapping between virtual blocks (blocks exposed by a virtual volume) and device blocks. For example, where indirection pairs such as "(virtual-block-i ⇔ device-block-n)" are mentioned, other pairs such as "(virtual-block-(i+1))↔device-block-n)" are implied. Known algorithms for performing many-to-one indirection (e.g., many virtual blocks to one device block) may be used. For instance, several virtual blocks may map to different offsets of a same device block; indirections of virtual blocks are in terms of device blocks and offsets.

Referring again to FIG. 4, if it is assumed that a virtual volume 180 resides on a storage device, and the virtual volume 180 is to store file data, units of file data 186 align with virtual or filesystem blocks, which align with device blocks. Although it may be desirable to avoid software indirection, some implementations may at times allow a virtual volume's virtual blocks to nonetheless be accessed by a filesystem or the like. For example, if the virtual volume numbers virtual blocks using the same numbering space of a filesystem's blocks (e.g., device block numbers), the filesystem can readily address device blocks vis-a-vis the virtual blocks. There is no reason why a virtual volume cannot be implemented as a mapping between sets of device block numbers.

Figure 5:
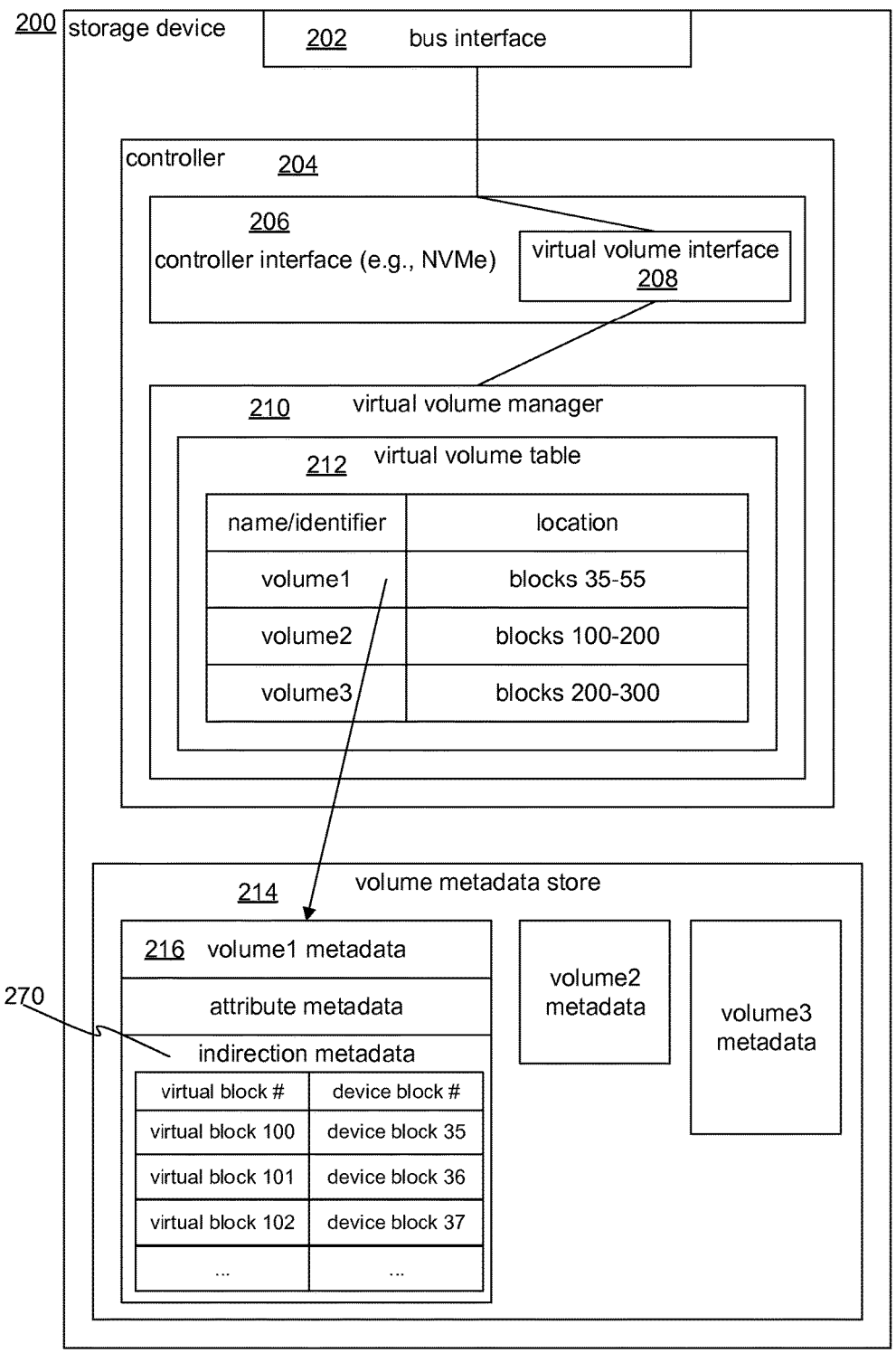
FIG. 5 shows a storage device with virtual volume features.

FIG. 5 shows a storage device 200 with virtual volume features. The storage device 200 may have a bus interface 202, such as a PCIe interface. The storage device 200 has a controller 204 that implements the storage logic needed by the storage device 200. The controller 204 may implement an NVMe standard. The controller 204 may expose a logical controller interface 206 that is analogous to an application programming interface (API). If a formal controller interface 206 is used, that interface may include a virtual volume interface 208. The virtual volume interface may be configured to receive instructions related to managing virtual volumes, such as instructions to create new virtual volumes, instructions to specify parameters of virtual volumes, reading and updating indirection data to be used for virtual volumes, content to be moved or copied to the virtual volume, a size of virtual blocks of the volume, a size of a virtual volume (e.g., a number of virtual or device blocks), specification of a virtual block numbering scheme (e.g., starting value, increments between virtual block numbers, etc.), and so forth.

A virtual volume manager 210 implements the functionality exposed by the virtual volume interface 208. The virtual volume manager 210 manages states and attributes of virtual volumes in a virtual volume table 212 and a volume metadata store 214. Each virtual volume has an entry in the virtual volume table 212, indexed by a name or identifier of the virtual volume. Separate compact storage of the device block numbers reserved for a virtual volume may enable quick access for other logic of the storage device 200 that can use the block numbers/ranges to prevent reads and writes to media areas reserved for the virtual volumes. In addition, each virtual volume may have a set of volume metadata 216 in the volume metadata store 214. As mentioned, this will generally include attribute metadata and indirection metadata. For security, the attribute metadata of a virtual volume may include a token, nonce, a private key signature, or some other piece of information that the virtual volume manager 210 may require before providing a channel to a virtual volume.

If the storage device 200 is an augmented NVMe SSD, the virtual volume mechanism may be built on top of NVMe's namespace features. That is to say, virtual volumes may be partly implemented as NVMe namespaces if the NVMe namespaces are provided with various additional features of virtual volumes. Put another way, virtual volumes can be NVMe namespaces with functionality such as indirection maintenance/storing and block reservation/assignment added to support storage virtualization. A storage device might also be built to include "copy offload" semantics, where the storage device can perform a copy of a block from one namespace to another, internally, perhaps by adding a reference to the data that already exists. Virtual volumes can be sufficiently self-contained so that little or no management or information outside the virtual volume is needed.

Figure 6:
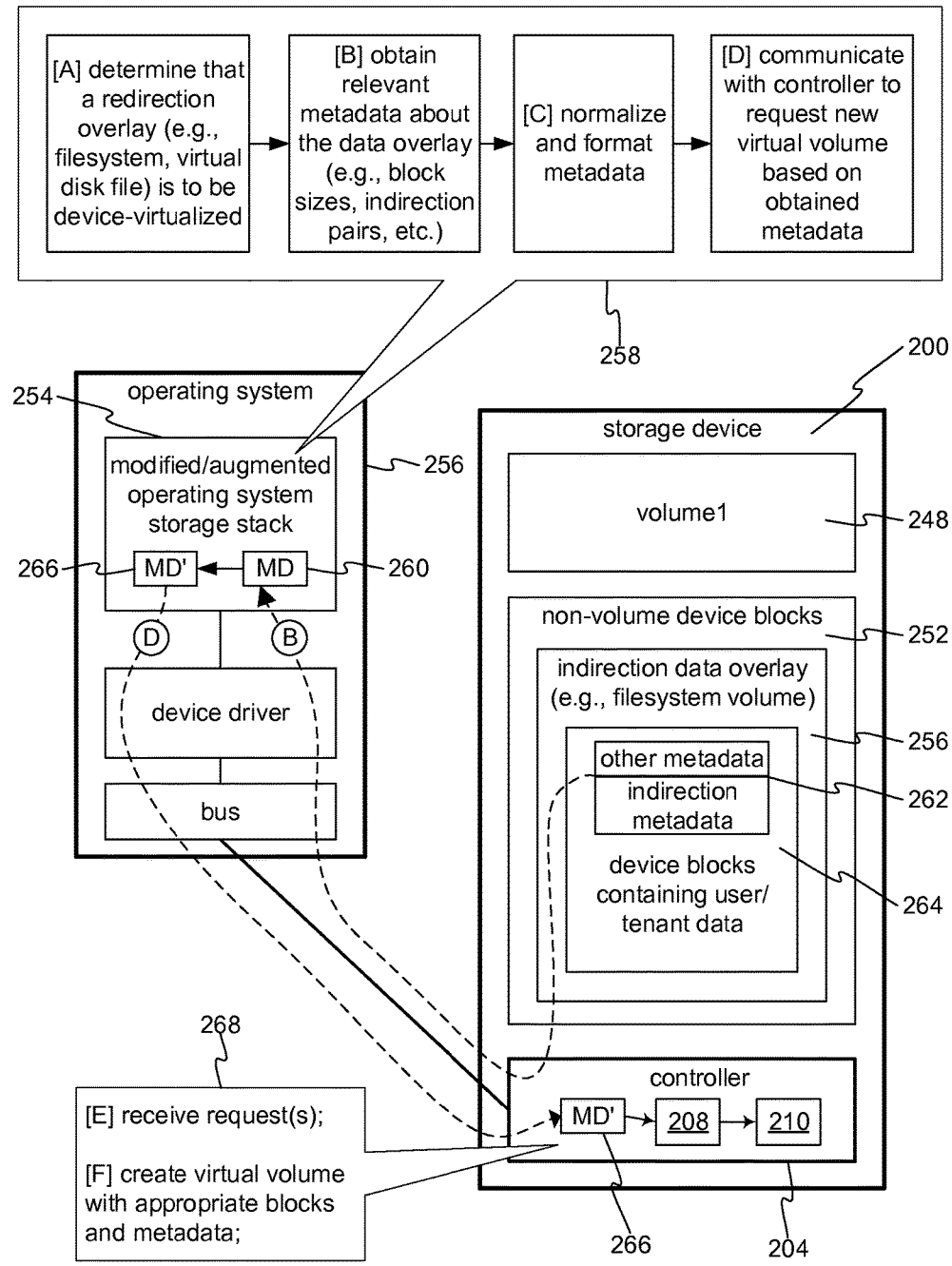
FIG. 6 shows an embodiment for configuring a virtual volume according to content in an existing filesystem.

FIG. 6 shows an embodiment for configuring a virtual volume 248 according to content in an existing filesystem 250 stored on the storage device 200 in non-volume device blocks 252. The non-volume device blocks 252 are at least initially not managed by the virtual volume manager 210. FIG. 5 mentions a "volume1" virtual volume, which will be used as an example of the virtual volume 248. A storage stack 254 of an operating system 256 performs a process 258 for initializing a virtual volume according to content of the filesystem 250. At step [A] there is a determination that the filesystem 256 or a portion thereof (depending on implementation) is to be device-virtualized. The determination can be a user input specifying a virtual disk file or a filesystem volume, for instance. The determination can also be an automatic determination based on factors such as recognition that the storage device 200 provides virtual volume support and that there is filesystem content suitable or marked for device virtualization. The process 258 can be performed by any software module/program or combinations thereof, possibly with kernel-mode privilege. For example, process 258 can be performed by a tool or utility program, and/or a virtualization hypervisor, and/or a virtual machine manager (a server that coordinates and controls multiple hypervisors) and/or a local agent thereof, and/or a virtual disk driver, and so forth.

At step [B] metadata 260 is gathered. This can involve a variety of techniques. If a virtual disk file is to be virtualized, the virtual disk file is parsed to extract relevant attribute metadata such as a virtual disk block size, a logical disk size, etc. Indirection metadata is also gathered. If a virtual disk file is to be virtualized, the file is opened, and according to the virtual disk file's format and content, virtual blocks in the file are mapped to corresponding filesystem locations (e.g., offsets in the virtual disk file), which are then mapped to device blocks according to the filesystem storing the virtual disk file. Additional steps might be needed, such as mapping file locations to clusters and clusters to device blocks. Ultimately, a set of indirection metadata is obtained that maps device blocks to upper layer blocks such as virtual disk file blocks or filesystem blocks; the upper layer blocks will then serve as the virtual volume blocks exposed by the new virtual volume. As shown in FIG. 6, obtaining the metadata 260 involves stepping down through the various storage layers and at each layer accessing indirection metadata such as filesystem metadata 262 to map the top level blocks (e.g., virtual blocks) to the current layer's blocks until the top level blocks are mapped to the bottom level device blocks 264 on which the source content and metadata initially resides.

If necessary, process 258 may include a step [C], where the metadata 260 is formatted and normalized to a form consistent with what the virtual volume interface 208 expects. For instance, ranges of overlapping or redundant indirection mappings may be condensed. Alternatively, a "copy offload" technique can be used, as discussed above. At step [D], the normalized metadata 266 is passed to the controller 204 and the virtual volume interface 208. The virtual volume manager 210 performs process 268, which includes step [E] of receiving one or more requests that at the least invoke a volume creation function and pass in data informing creation of the new virtual volume. At step [F] the virtual volume manager 210 creates the virtual volume. This may involve setting up entries in the virtual volume table 212 and volume metadata store 214, copying in the initial indirection mappings between the new volume's virtual blocks and device blocks, and otherwise configuring the virtual volume 248 according to the corresponding metadata. If the storage device 200 has a transparent internal indirection layer, device block contents can be moved around without changing the device block numbers, if device block consolidation is needed.

When finished being initialized, the virtual volume 248 is exposed as such by the storage device 200. Data may be read and written to the virtual volume 248 in much the same way that non-virtualized blocks are read and written. For example, the same set of commands and semantics are used for virtual volume access, with the additional ability to address individual virtual blocks. If the storage device 200 is an NVMe storage device, ordinary NVMe commands may be used. For example, an NVMe write request may specify inbound data and virtual block number virtual-block-101. When the storage device 200 determines that the write is associated with the particular virtual volume 248, the storage device 200 applies virtual-block-101 to the corresponding indirection metadata 270 (see FIG. 5) to identify a device block number (device-block-36) and perhaps an offset into the device block to be used for the write. Alternatively, the storage device exposes the device blocks of the virtual volume and the indirection metadata is updated by software. The stored indirection metadata allows any software that accesses the virtual volume to know where the virtual blocks are located with respect to device blocks.

To elaborate on a reason for sending storage commands (NVMe in particular) in terms of a secondary namespace's LBAs (Logical Block Addresses, or virtual block number/address), consider that by creating a secondary namespace on a storage device, the secondary namespace (or block address space) is created in terms of LBAs (or other units such as virtual blocks) that are used by the tenant (e.g., operating system, application, administrator within the VM, etc.). Conveniently, this device-based translation/indirection between the tenant's view and the host's view can obviate the need for translation/indirection beyond the storage device. Not only can a filesystem indirection possibly be avoided, but communication with the filesystem itself can be avoided. In addition, device-based indirection can be combined with techniques that show enough of an underlying NVMe controller (or similar) through to a virtual machine to enable the tenant virtual machine itself to enqueue requests. For further understanding, see the Single-Root I/O Virtualization (SR-IOV) standard. For a tenant virtual machine to enqueue requests, preferably the tenant can only access its data and cannot access the data of other tenants. In sum, the LBAs (or generically, virtual block numbers) that the tenant uses are ones from a secondary namespace which only contains that tenant's data.

It should be noted that the steps in FIG. 6 and others described herein need not be performed in the order by which they are described. And, some steps may be omitted.

Figure 7:
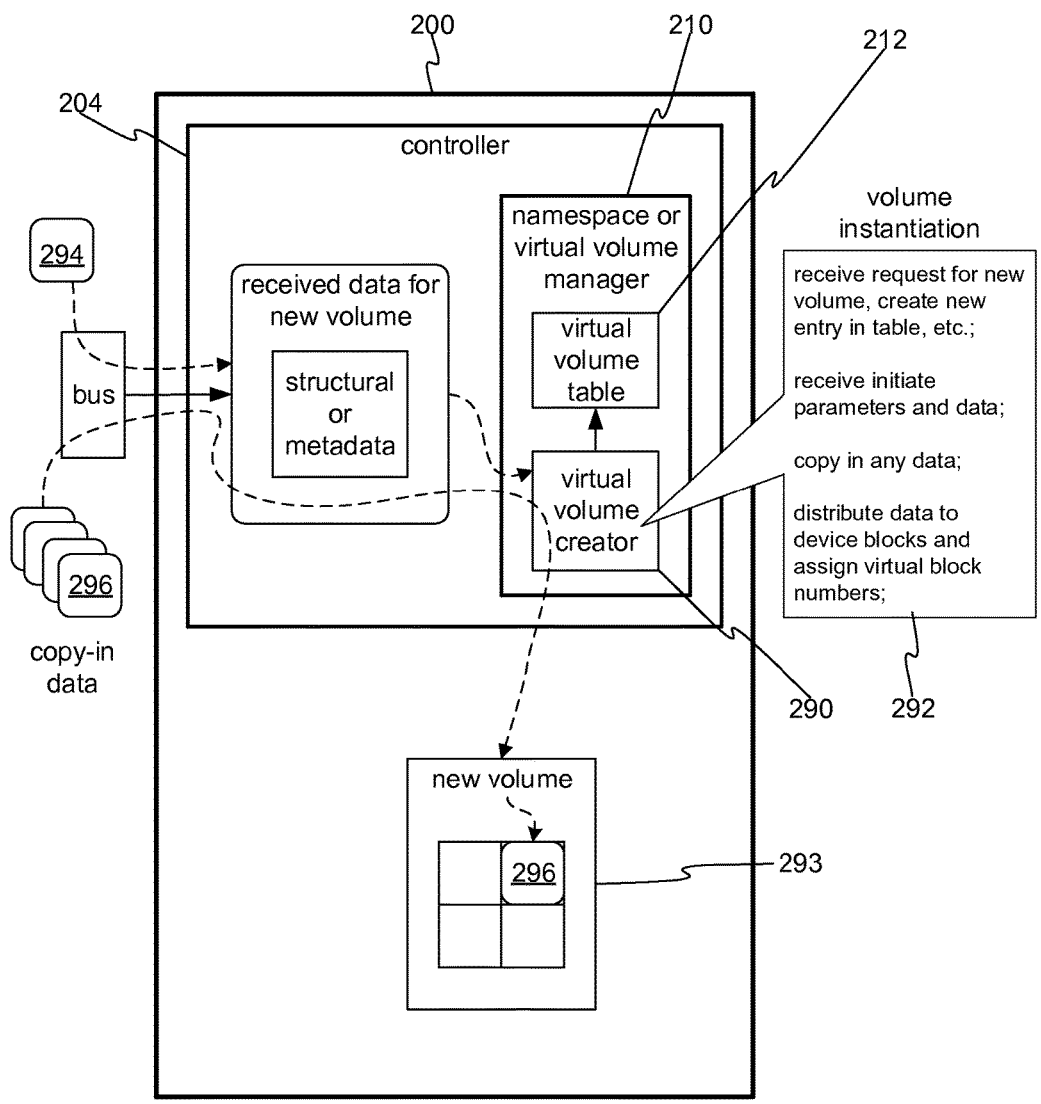
FIG. 7 shows an embodiment for initializing a virtual volume by copying in data rather than allocating device blocks on the storage device.

FIG. 7 shows an embodiment for initializing a virtual volume by copying in data rather than allocating device blocks on the storage device 200. The virtual volume manager 210 includes a virtual volume creator which performs a process 292. A new virtual volume 293 is created according to arbitrary volume parameters 294 such as a virtual block size, which may have been inputted by a user. As copy-in data 296 is received, the virtual volume creator 290 buffers the data, fills the virtual blocks of the new virtual volume 293, and generates new indirection pairs as the virtual blocks are filled. When finished, the copied in data is addressable in the virtual blocks of the new virtual volume 293. Any virtual volume attribute that is not specified to the storage device 200 can be assigned a default value by the virtual volume creator 290.

The processes for creating a virtual volume can also be reversed; a virtual volume can be used as a source for creating a new virtual disk file. Any software that implements a virtual disk format can request a virtual volume's metadata from a storage device. The software uses the structural metadata to initialize the virtual disk file with the proper virtual block size or other attributes. The software also uses the indirection metadata of the virtual volume to read the virtual blocks from the virtual volume, insert them into the virtual disk file in a manner consistent with the virtual disk format, and update the indirection metadata of the virtual disk file.

Figure 8:
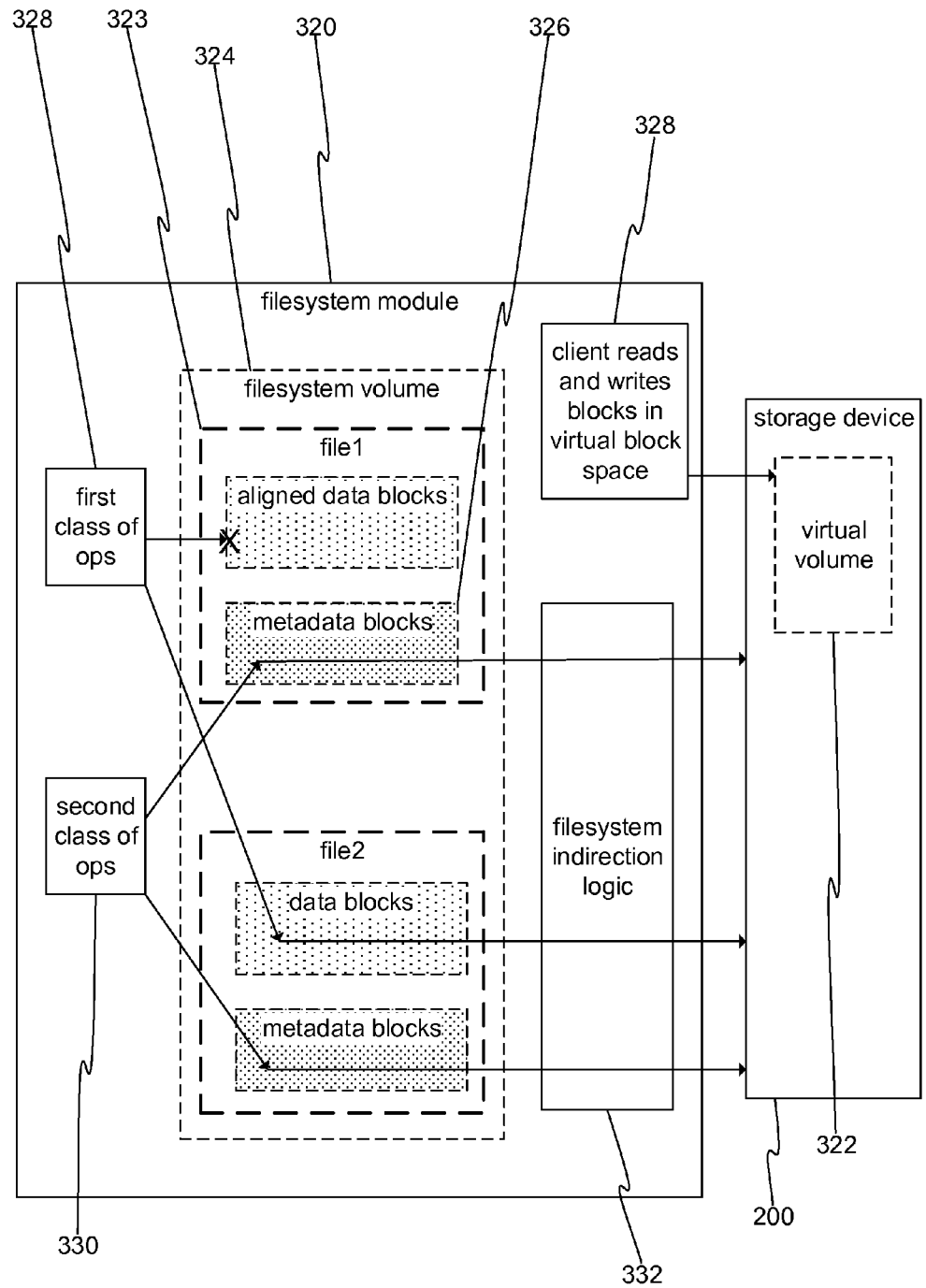
FIG. 8 shows how a filesystem module may be modified to help preserve the integrity of a virtual volume that is serving as a backing store for a file in a filesystem volume.

FIG. 8 shows how a filesystem module 320 may be modified to help preserve the integrity of a virtual volume 322 that is serving as a backing store for a file 323 ("file1") in a filesystem volume 324. The filesystem module 320 has an indication that the file 323 has a special status or is associated with the virtual volume 322. In one embodiment, the indication is an attribute of the file 322 in the filesystem metadata 326. In another embodiment, the indication may be a list of filenames or a list of device blocks that have been pinned to virtual volumes. In any case, the filesystem module 320 monitors for first operations 328 that if performed would change the content of the file 323. For example, truncations, writes, physical moves, etc. Internal filesystem operations like moving device blocks for defragmentation or file consolidation can also be inhibited or avoided with appropriate filesystem modifications. The filesystem module 320 prevents these types of operations from occurring, which preserves the indirection mapping of the corresponding virtual volume 322. If the storage device 200 is able to protect the integrity of virtual volumes, then the filesystem module 320 can be designed to allow lower storage layers to reject the first operations 328; the filesystem module 320 handles the rejections. In sum, either the filesystem module 320, the software storage stack, or the storage device 200, or a combination thereof, prevent the indirection mappings of virtual volumes from being inadvertently corrupted.

Although file 323 has a virtual volume attached to it, the filesystem module 320 in some ways treats the file 323 as any other file. Second filesystem operations 330 can be performed as they would be on any other file. Generally, any filesystem operation that would alter the metadata of the file 323 but not the content of the file 323 can be performed in its usual manner. For instance, the filesystem module 320 allows renaming of the file 323, logically moving the file 323 within the filesystem 324, changing permissions or owners of the file 323, and so forth.

The hybrid software-hardware approach allows the file 323 to be managed as a filesystem object. It also allows the content of the file 323 to be virtualized by the storage device 200. This can have many advantages.

Figure 9:
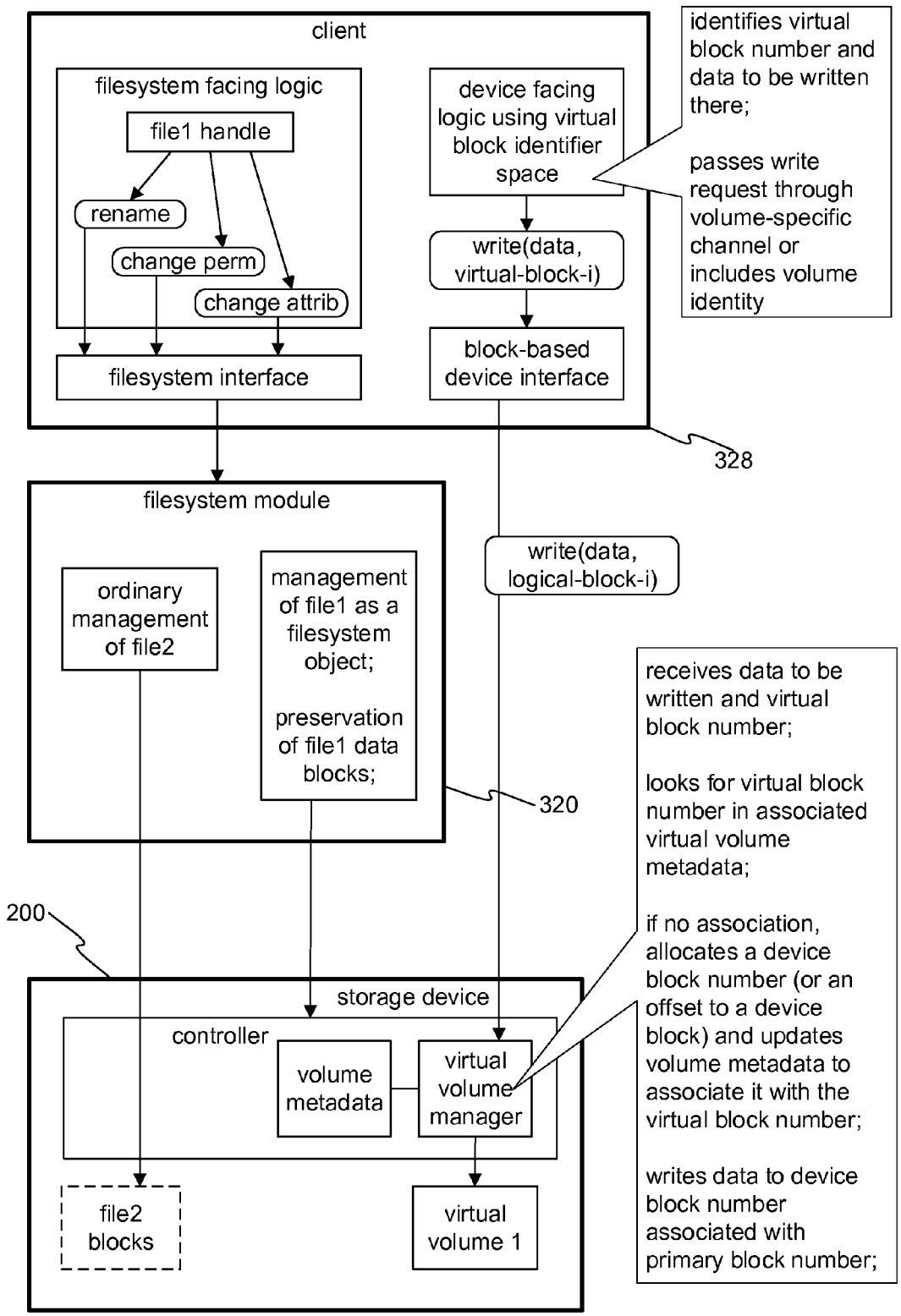
FIG. 9 shows a client interfacing with storage device and the file system module.

FIG. 9 shows the client 328 interfacing with the storage device and the file system module. The client may have filesystem facing logic that can interact with the file as a filesystem object. The client also has device facing logic that communicates with the storage device and the virtual volume without using the filesystem module 320. As discussed above, the client 328 passes read and write requests directed to virtual blocks. The client may be a virtual disk driver, a hypervisor, or a virtual device driver in a virtual machine, for example. The client can read and write to storage using virtual storage addresses and indirection to device blocks is handled without having to pass through filesystem indirection logic 332 or perhaps other layers of a complex software storage stack. If need be, the filesystem module 320 can also be configured to access the content of files backed by virtual volumes.

Figure 10:
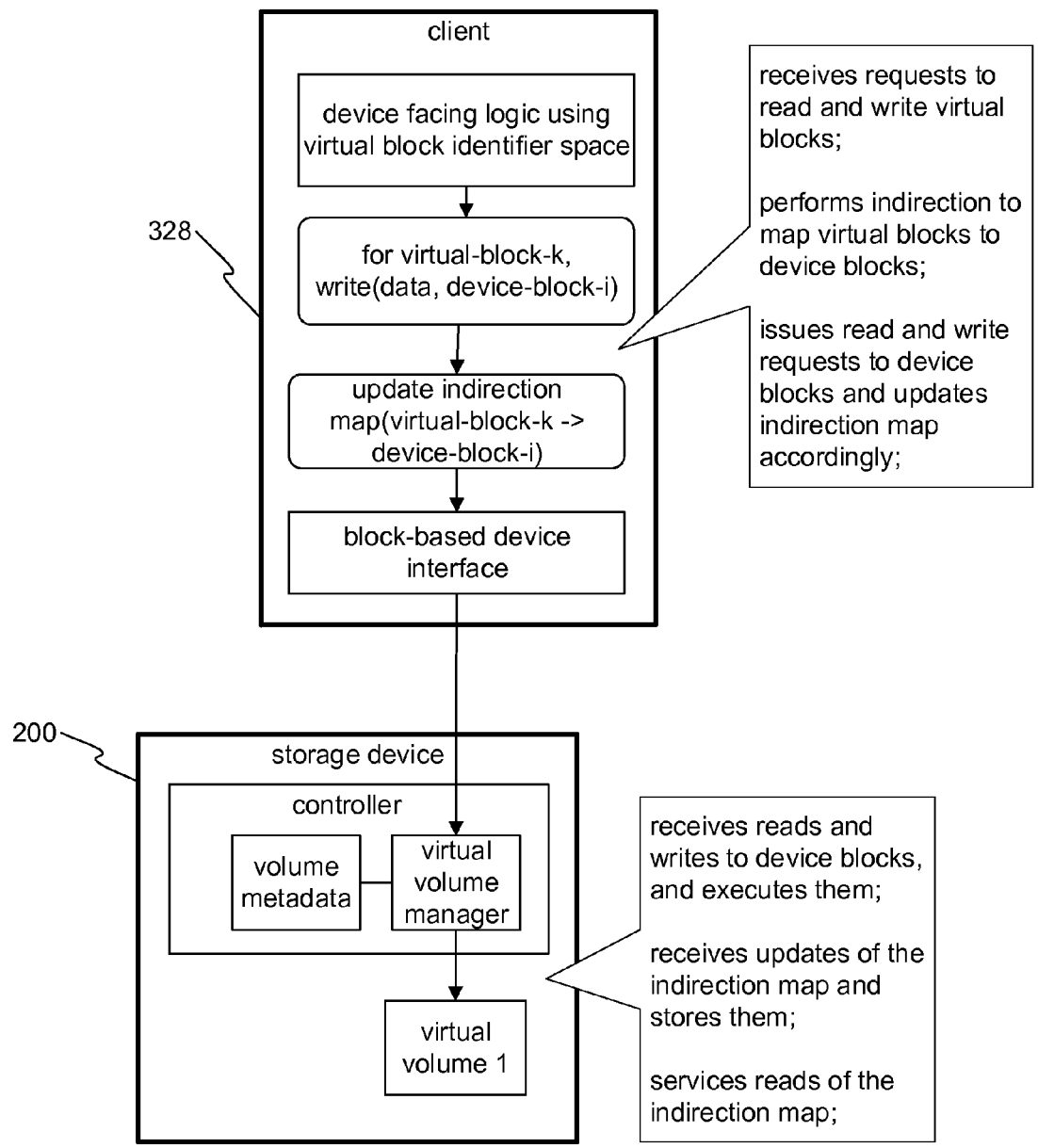
FIG. 10 shows another embodiment of a client and storage device.

FIG. 10 shows another embodiment of the client 328 and the storage device 200. In this embodiment, the storage device 200 does not perform indirection or determine which virtual blocks will go in which device blocks. Instead, whichever software component is accessing the virtual volume manages the indirections between virtual blocks and device blocks, and the software (e.g., client 328) tells the storage device what those mappings are. The storage device stores the mappings so that any software accessing the virtual volume can then use the indirection mappings to present the same virtual blocks with the assurance that any given virtual block number will refer to the correct physical media location.

In this embodiment, the storage device 200 may use the indirections to know which device blocks to lock down and prevent changes except through requests directed to the corresponding virtual volume. Assume that the client 328 is a virtual disk driver using a virtual disk file to provide a virtual block storage device (a virtual drive). The virtual disk driver parses the virtual disk file's filesystem-based metadata to identify an associated virtual volume. The virtual disk driver then opens a connection to the virtual volume and obtains the virtual volume's indirection metadata. The virtual disk driver can expose the virtual volume's virtual blocks as a virtual disk (perhaps accessed by a virtual machine guest), while controlling which virtual blocks go in which device blocks and while handling reads and writes to virtual blocks by sending corresponding reads and writes to the correct device blocks (and possibly offsets therein). The virtual disk driver updates the virtual volume's indirection metadata to reflect the virtual block updates. The storage device also can decide which device blocks to sequester to the virtual volume when new device blocks are needed to store new virtual blocks. The storage device protects the integrity of the virtual volume using the indirection metadata. Alternatively, the storage device uses a predefined range or set of reserved device blocks which are excluded from the pool of device blocks that the storage device considers to be unused.

In another embodiment, a virtual machine guest can be configured to have two modes of operation. As discussed above with reference to SR-IOV, the device driver employed by a virtual machine can be one designed for the specific storage device. If the specific device is an NVMe device, a same driver for non-virtualized access to the specific storage device can be used. Virtual machines can also use device drivers which are either for devices the hypervisor is emulating or for 'paravirtualized' I/O channels, where the device driver is specifically designed for use in a virtual machine. A virtual machine guest can be configured to alternate between two modes of using a virtual volume. In a first mode, the first type of driver is used, and in the second mode the second type of driver is used.

A storage device may also include operations for wholesale manipulation of virtual volumes. For example, a virtual volume might be duplicated. Instead of copying all of the blocks of a duplicated virtual volume, the duplicate accumulates differences between the parent virtual volume. As discussed next, this can enable chains of differencing virtual disk files to be implemented with respective virtual volumes.

Snapshots of virtual machines have man uses. To take a snapshot, copying all the data in the virtual disks can be prohibitive. Even if sufficient space is available for a complete copy, copying quickly enough to avoid downtime is unlikely. Instead of making a complete copy, a snapshot of storage can be generated that only contains differences from the source virtual volume, and the cost of tracking those differences is proportional to the number of changes. As mentioned, chains of differencing virtual disk files can collectively contain the data of a virtual disk and each file contains differences over the file from which it was forked. A similar effect can be accomplished with virtual volumes. A block database can be provided where each related virtual disk snapshot has references to blocks in the database. A copy-on-write scheme can be used, where new data displaces old data in the virtual disk file, and where old data is copied to a secondary file.

Figure 11:
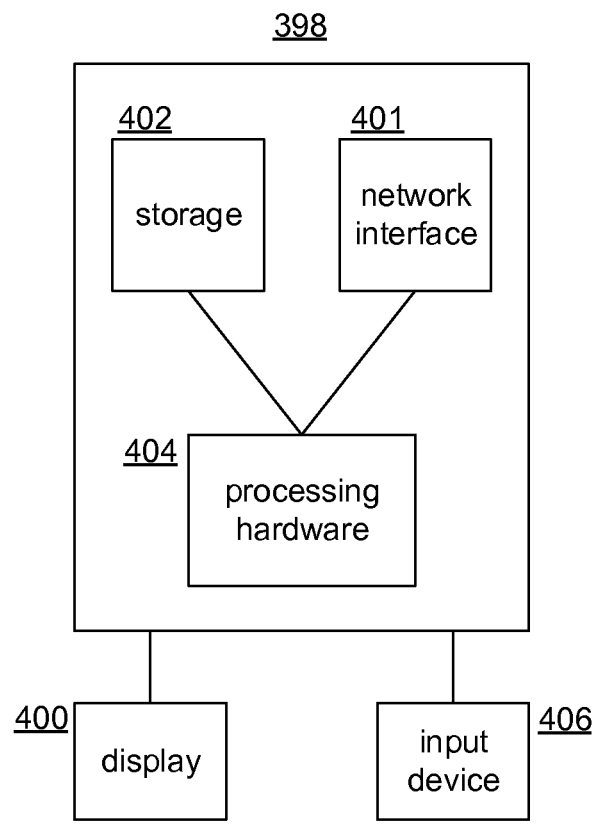
FIG. 11 shows details of a computing device.

FIG. 11 shows details of a computing device 398 on which embodiments described above may be implemented. The computing device 398 may have a display 400, a network interface 401, as well as storage 402 and processing hardware 404, which may be a combination of any one or more: central processing units, graphics processing units, analog-to-digital converters, bus chips, Field-programmable Gate Arrays (FPGAs), Application-specific Integrated Circuits (ASICs), Application-specific Standard Products (ASSPs), or Complex Programmable Logic Devices (CPLDs), etc. The storage 402 may be any combination of magnetic storage, static memory, volatile memory, etc. The meaning of the term "storage", as used herein does not refer to signals or energy per se, but rather refers to physical apparatuses, possibly virtualized, including physical media such as magnetic storage media, optical storage media, static memory devices, etc., but not signals per se. The hardware elements of the computing device 398 may cooperate in ways well understood in the art of computing. In addition, input devices 406 may be integrated with or in communication with the computing device 398. The computing device 398 may have any form factor or may be used in any type of encompassing device. The computing device 398 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A computing device comprising:
   processing hardware and a physical data storage unit comprised of physical media, the computing device storing an operating system, the operating system comprising a filesystem module;
   the physical media of the physical data storage unit storing a filesystem volume configured to be managed by the filesystem module, wherein the physical data storage unit manages virtual volumes that can be addressed by commands that identify the virtual volumes and that are directed to a controller of the physical data storage unit, the virtual volumes comprising objects managed by the controller of the physical data storage unit and exposed by the physical data storage unit; and
   wherein the filesystem module is configured to associate files in the filesystem with the virtual volumes, respectively, and wherein the filesystem module is further configured to enable the content of the files to be stored in the virtual volumes while managing the files as filesystem objects.

2. A computing device according to claim 1, wherein the filesystem volume comprises metadata indicating which of the virtual volumes are associated with which of the files.

3. A computing device according to claim 1, wherein the file system module is configured to handle one or more types of operations directed to arbitrary files of the filesystem by determining, from metadata content of the arbitrary files and/or from filesystem metadata, whether the arbitrary files are associated with virtual volumes, the determining controlling how and/or whether the one or more types of operations are performed by the filesystem.

4. A computing device according to claim 1, wherein the filesystem module comprises a filter configured to intercept filesystem operations directed to content of the files that are associated with the virtual volumes.

5. A computing device according to claim 4, wherein the filesystem is configured to either prevent updates to the content of the files via the filesystem or redirect the updates to the virtual volume.

6. A computing device according to claim 1, wherein a client executing on the computing device updates the content of a file by directing write operations to the virtual volume, wherein the write operations do not pass through the filesystem module, and wherein the file is managed by the filesystem during the write operations.

7. A computing device according to claim 6, wherein the client exposes the virtual volume as a virtual block-based storage device.

8. A computing device according to claim 1, wherein the filesystem module manages the physical data storage unit to ensure sufficient capacity to perform operations for specific volumes.

9. A method according to claim 4, wherein the physical data storage unit stores virtual volume metadata in association with the virtual volume, the metadata indicating at least a block size of the virtual volume, the method further comprising requesting the virtual volume metadata from the physical data storage unit and using the block size to automatically configure a second virtual disk file.

10. A method performed by a computing device, the method comprising:
    storing a first part of a filesystem file in a filesystem volume managed by a filesystem module, the file system volume stored on physical media of a physical data storage unit, and storing a second part of the filesystem file in a virtual volume also comprised of physical media of the physical data storage unit, wherein the virtual volume is not part of the filesystem volume, wherein the physical data storage unit manages the virtual volume by storing information indicating which blocks of the physical media are associated with the virtual volume, wherein accesses to the second part of the file through the filesystem module do not pass through indirection logic of the filesystem module, and wherein accesses to the first part of the file pass through the indirection logic of the filesystem module.

11. A method according to claim 10, wherein a client executing on the computing device addresses reads and writes to device blocks of the virtual volume to provide a virtual disk drive, the virtual disk drive comprising a block-based virtual storage device.

12. A method according to claim 10, further comprising storing virtual blocks in device blocks of the virtual volume by aligning the virtual blocks with the device blocks.

13. A method according to claim 10, further comprising enabling access to the first part of the file through the filesystem module while disallowing access to the second part of the file through the filesystem module.

14. A method according to claim 8, further comprising storing a differencing virtual volume on the storage device, the differencing virtual volume linked to the virtual volume, wherein after the differencing virtual volume is linked to the virtual volume, updates to the virtual volume are stored in the differencing virtual volume.

15. A method performed by a physical data storage unit comprising a physical interface, a physical storage media, and a controller, the method comprising:
    exposing, via the physical interface, a first volume of the physical storage media, the first volume comprising first device blocks of the physical storage media, first logical block addresses (LBAs) for the first volume, and associating the first device blocks with the first LBAs, wherein device blocks comprise units of the physical storage media that are managed by the physical data storage unit, the physical data storage unit configured to use the first information to read/write data from/to a device block according to an indications of the first volume and of a corresponding LBA received via the physical interface;
    determining that a first request received via the physical interface corresponds to a request to create a virtual volume, the first request including data informing creation of the virtual volume, the virtual volume comprising the first device blocks of the physical media, second LBAs for the virtual volume, and associating the first device blocks with the second LBAs, the first LBAs being different from the second LBAs, and a first LBA of the first LBAs and a second LBA of the second LBAs each correspond to a same first device block; and
    exposing, via the physical interface, the virtual volume;
    receiving a second request comprising indicia of a requested action; and
    when the requested action is either (a) for the second LBA on the virtual volume or (b) for the first LBA on the first volume, performing the action on the first device block.

16. A method according to claim 15, wherein the associating the first device blocks with the first LBAs is based on metadata obtained from a virtual disk file.

17. A method according to claim 16, further comprising storing the content of the virtual disk file in the device blocks of the virtual volume.

18. A method according to claim 17, wherein the storing comprises copying the content of the virtual disk file to the device blocks of the virtual volume.

19. A method according to claim 17, wherein the storing comprises assigning device blocks that store the virtual disk file to the virtual volume.

20. A method according to claim 15, wherein the controller that implements a Non Volatile Memory express (NVMe) interface, wherein the virtual volume is stored as an NVMe namespace, and wherein the controller stores associations between device blocks and the NVMe namespace.

* * * * *